(12) United States Patent
Nagarajan et al.

(10) Patent No.: US 12,556,268 B2
(45) Date of Patent: Feb. 17, 2026

(54) DYNAMIC FREQUENCY SHIFT TO MITIGATE NOISE FIGURE (NF) DEGRADATION

(71) Applicant: QUALCOMM Incorporated, San Diego, CA (US)

(72) Inventors: Saranyan Nagarajan, Hyderabad (IN); Lekshmy Mohan, Bengaluru (IN); Srinivas Pachava, San Diego, CA (US); Sriramgopal Sridhara, San Diego, CA (US); Ehab Abdel Ghany, San Diego, CA (US); Mahim Ranjan, San Diego, CA (US); Priyangshu Ghosh, Hyderabad (IN); Lan Lan, San Diego, CA (US); Parthiban Rajendran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 18/610,901

(22) Filed: Mar. 20, 2024

(65) Prior Publication Data

US 2025/0300724 A1  Sep. 25, 2025

(51) Int. Cl.
*H04B 7/185* (2006.01)
*H03L 7/06* (2006.01)
*H04B 1/04* (2006.01)

(52) U.S. Cl.
CPC ........... *H04B 7/18528* (2013.01); *H03L 7/06* (2013.01); *H04B 1/0475* (2013.01)

(58) Field of Classification Search
CPC ...... H04B 7/18528; H04B 1/0475; H03L 7/06

USPC ........ 375/145, 227, 262, 340, 344, 355, 371
See application file for complete search history.

(56) References Cited

U.S. PATENT DOCUMENTS

| | | | | |
|---|---|---|---|---|
| 6,466,803 | B1* | 10/2002 | Gardner | H03J 7/04 455/260 |
| 6,928,275 | B1* | 8/2005 | Patrick | H03J 7/04 455/256 |
| 9,882,661 | B1* | 1/2018 | Gross | H04B 17/21 |
| 12,425,111 | B2* | 9/2025 | Anderson | H04B 17/0085 |
| 2003/0154025 | A1* | 8/2003 | Fuchs | G01S 19/072 342/357.66 |
| 2003/0176204 | A1* | 9/2003 | Abraham | H03L 1/025 455/556.1 |
| 2004/0063411 | A1* | 4/2004 | Goldberg | H04B 1/3805 455/257 |
| 2004/0130484 | A1* | 7/2004 | Krasner | G01S 19/235 342/357.68 |
| 2006/0038719 | A1* | 2/2006 | Pande | G01S 19/46 342/357.64 |
| 2008/0118015 | A1* | 5/2008 | Wilson | H04L 7/0091 375/358 |

(Continued)

*Primary Examiner* — Emmanuel Bayard
(74) *Attorney, Agent, or Firm* — Patterson + Sheridan, L.L.P.

(57) ABSTRACT

Certain aspects of the present disclosure are directed towards methods and apparatus for wireless communication. An example method generally includes: comparing a requested local oscillator (LO) frequency for a first LO signal of a first subscriber with an LO frequency for a second LO signal of a second subscriber, determining a frequency offset for the first LO signal based on the comparison, and tuning a frequency of the first LO signal based on the requested LO frequency and the frequency offset.

19 Claims, 10 Drawing Sheets

(56) References Cited

U.S. PATENT DOCUMENTS

| | | | |
|---|---|---|---|
| 2009/0147897 A1* | 6/2009 | Shin | H03L 7/00 |
| | | | 375/355 |
| 2010/0098195 A1* | 4/2010 | Nekhamkin | H04L 27/0014 |
| | | | 375/344 |
| 2013/0208839 A1* | 8/2013 | Isberg | H03J 7/065 |
| | | | 375/371 |
| 2020/0309901 A1* | 10/2020 | Mimeault | G01S 7/282 |
| 2021/0014448 A1* | 1/2021 | Kato | H04N 25/76 |
| 2021/0156959 A1* | 5/2021 | Scherz | G01S 7/352 |
| 2021/0190935 A1* | 6/2021 | Yu | G01S 13/84 |

* cited by examiner

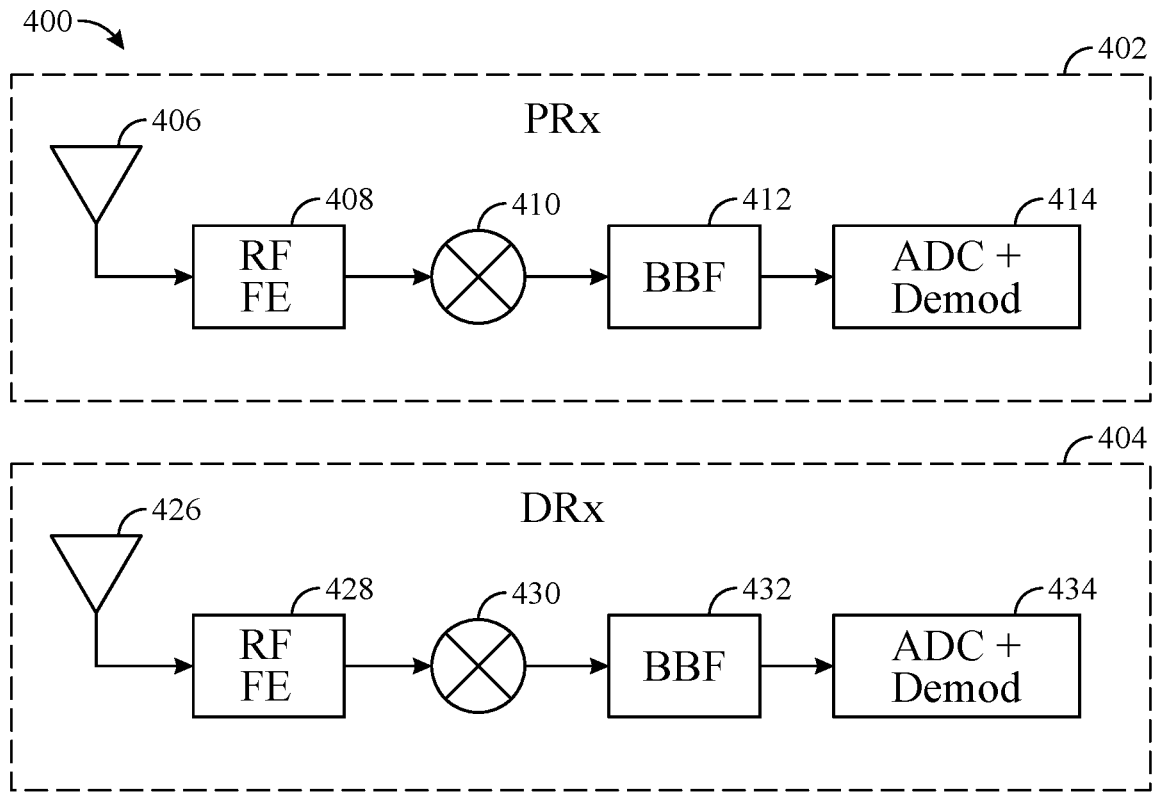
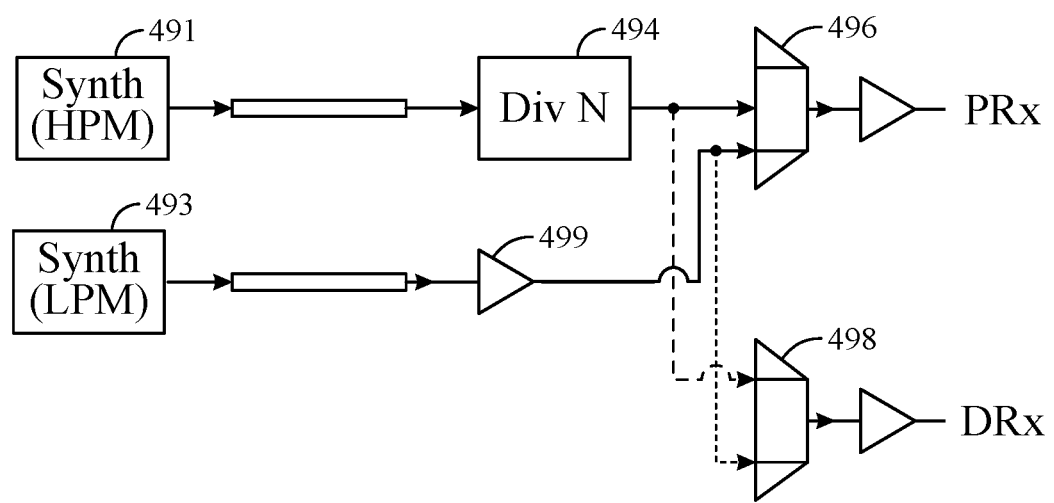
FIG. 4

```
800 if   PRX_LO ∈ {LB}  &&  DRX_LO ∈ {LB}  % Both LOs should be in same band group, LB
     % no LIF elseif PRX_LO ∈ {MB} && DRX_LO ∈ {MB}
    LIF = F̄1
    if abs (PRX_LO-DRX_LO) < LIF % check if both LOs are at closer vicinity
       PRX_LO/DRx_LO = PRX_LO/DRx_LO +/- (abs (PRX_LO-DRX_LO) - LIF) ;
       Effective_BW = PRX/DRx_channel_BW + 2*abs(abs (PRX_LO-DRx_LO) - LIF) ;
       RFIC_BW = floor (Effective_BW) ;
    end elseif PRX_LO ∈ {HB} && DRX_LO ∈ {HB}
    LIF = F̄4
    if abs (PRX_LO-DRX_LO) < LIF % check if both LOs are at closer vicinity
       PRX_LO/DRx_LO = PRX_LO/DRx_LO +/- (abs(PRX_LO-DRx_LO) - LIF) ;
       Effective_BW = PRX/DRx_channel_BW + 2*abs(abs(PRX_LO-DRx_LO) - LIF) ;
       RFIC_BW = floor (Effective_BW) ;
    end elseif PRX_LO ∈ {UNA} && DRX_LO ∈ {UNA}
    LIF = F̄3
    if abs (PRX_LO-DRX_LO) < LIF % check if both LOs are at closer vicinity
       PRX_LO/DRx_LO = PRX_LO/DRx_LO +/- (abs(PRX_LO-DRx_LO) - LIF) ;
       Effective_BW = PRX/DRx_channel_BW + 2*abs(abs(PRX_LO-DRx_LO) - LIF) ;
       RFIC_BW = floor (Effective_BW)
    end end
```

FIG. 8

DYNAMIC FREQUENCY SHIFT TO MITIGATE NOISE FIGURE (NF) DEGRADATION

TECHNICAL FIELD

Certain aspects of the present disclosure generally relate to electronic circuits and, more particularly, to techniques for performing dynamic frequency shifts.

BACKGROUND

Wireless communication devices are widely deployed to provide various communication services such as telephony, video, data, messaging, broadcasts, and so on. Such wireless communication devices may transmit and/or receive radio frequency (RF) signals via any of various suitable radio access technologies (RATs) including, but not limited to, Fifth Generation (5G) New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., WiFi), and the like.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include one or more frequency synthesizers that generate local oscillator (LO) signals for down-conversion or up-conversion of signals.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include reduced noise.

Certain aspects are directed towards a method for wireless communication. The method generally includes comparing a requested local oscillator (LO) frequency for a first LO signal of a first subscriber with an LO frequency for a second LO signal of a second subscriber, determining a frequency offset for the first LO signal based on the comparison, and tuning a frequency of the first LO signal based on the requested LO frequency and the frequency offset.

Certain aspects are directed towards an apparatus for wireless communication. The apparatus generally includes one or more memories collectively storing executable instructions and one or more processors coupled to the one or more memories. The one or more processors are generally collectively configured to execute the executable instructions to cause the apparatus to compare a requested LO frequency for a first LO signal of a first subscriber with an LO frequency for a second LO signal of a second subscriber, determine a frequency offset for the first LO signal based on the comparison, and tune a frequency of the first LO signal based on the requested LO frequency and the frequency offset.

Certain aspects are directed towards a wireless device. The wireless device generally includes a receiver comprising: a first receive path for a first subscriber, the first receive path including a first mixer for signal down-conversion using a first LO signal; and a second receive path for a second subscriber, the second receive path including a second mixer for signal down-conversion using a second LO signal. The wireless device may also include one or more controllers coupled to the receiver and collectively configured to compare a requested LO frequency for the first LO signal with an LO frequency of the second LO signal, determine a frequency offset for the first LO signal based on the comparison, and tune a frequency of the first LO signal based on the requested LO frequency and the frequency offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates a downlink pipe (DLP) including a primary receive path (PRx) and a diversity receive path (DRx).

FIG. 8 illustrates pseudo-code for determining a LIF offset, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
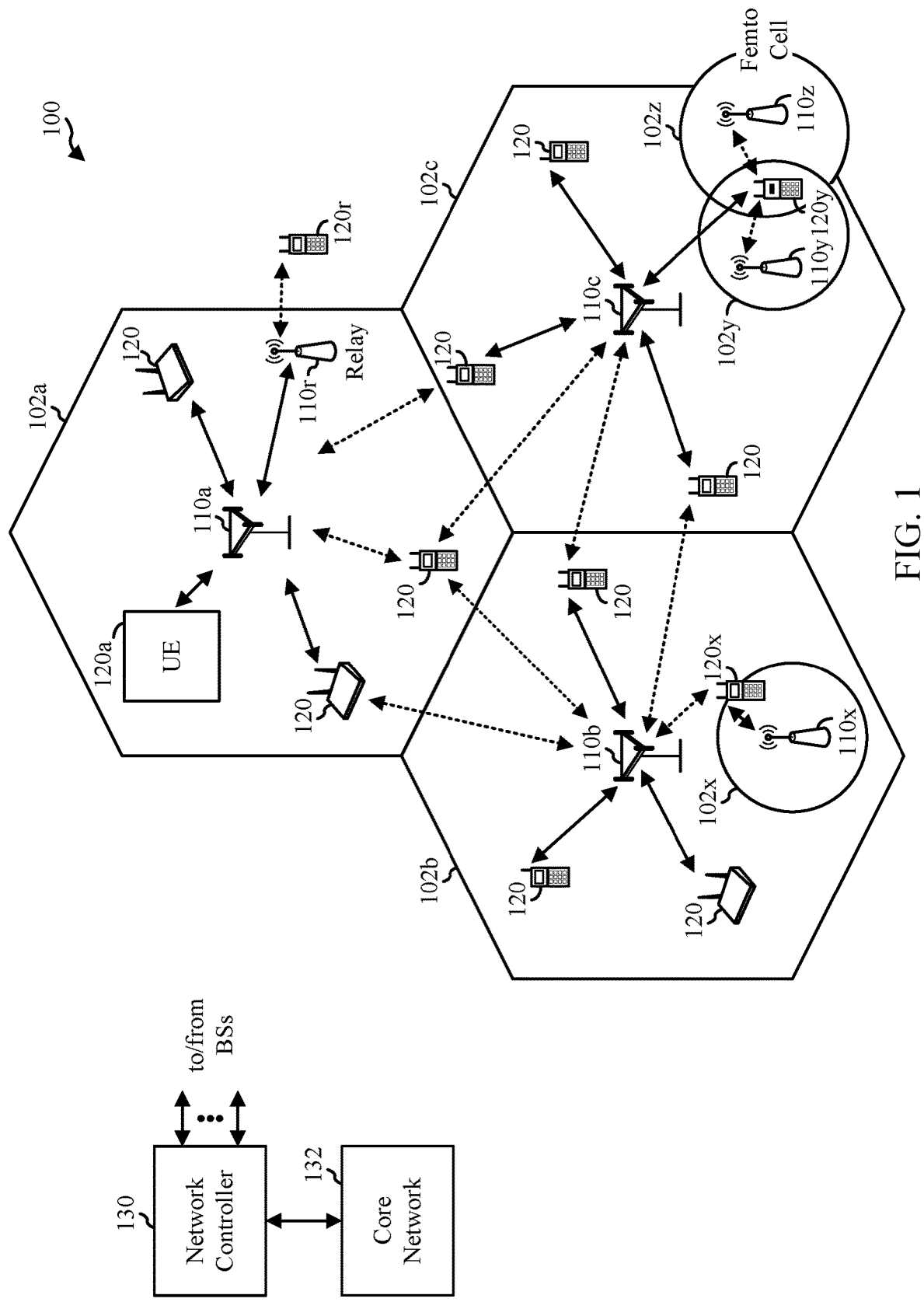
FIG. 1 is a diagram of an example wireless communications network, in which aspects of the present disclosure may be practiced.

Certain aspects of the present disclosure are directed toward dynamic frequency shifting of a local oscillator (LO) signal to improve noise figure (NF) performance. Dynamic frequency shifting may be used to separate frequencies of LO signals for different subscribers. The frequency shifting may be implemented by shifting the frequency of an LO signal of one of the subscribers, which may also be referred to as a low intermediate frequency (LIF) offset. For example, a wireless device may dynamically switch between zero intermediate frequency (IF) and LIF based on calculated spurs of LO signals and/or based on separation between LO subscriber frequencies. For every subscriber tuning, the device may determine whether to implement a LIF offset by checking the tune configuration for the subscriber alongside with a previously tuned configuration of another subscriber. A controller may identify the separation in the frequency domain between the LO signal of a first subscriber and the LO signal of a second subscriber. No LIF offset may be applied if the separation is more than a threshold frequency offset. On the other hand, if the separation is less than the threshold frequency offset, a LIF offset may be applied.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Wireless System

FIG. 1 illustrates an example wireless communications network 100, in which aspects of the present disclosure may be practiced. For example, the wireless communications network 100 may be a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation/Third Generation (2G/3G) network), or a code division multiple access (CDMA) system (e.g., a 2G/3G network), or may be configured for communications according to an IEEE standard such as one or more of the 802.11 standards, etc.

As illustrated in FIG. 1, the wireless communications network 100 may include a number of base stations (BSs) 110a-z (each also individually referred to herein as "BS 110" or collectively as "BSs 110") and other network entities. A BS may also be referred to as an access point (AP), an evolved Node B (eNodeB or eNB), a next generation Node B (gNodeB or gNB), or some other terminology.

A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communications network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with one or more user equipment's (UEs) 120a-y (each also individually referred to herein as "UE 120" or collectively as "UEs 120") in the wireless communications network 100. A UE may be fixed or mobile and may also be referred to as a user terminal (UT), a mobile station (MS), an access terminal, a station (STA), a client, a wireless device, a mobile device, or some other terminology. A user terminal may be a wireless device, such as a cellular phone, a smartphone, a personal digital assistant (PDA), a handheld device, a wearable device, a wireless modem, a laptop computer, a tablet, a personal computer, etc.

The BSs 110 are considered transmitting entities for the downlink and receiving entities for the uplink. The UEs 120 are considered transmitting entities for the uplink and receiving entities for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink. $N_{up}$ UEs may be selected for simultaneous transmission on the uplink, $N_{dn}$ UEs may be selected for simultaneous transmission on the downlink. $N_{up}$ may or may not be equal to $N_{dn}$, and $N_{up}$ and $N_{dn}$ may be static values or can change for each scheduling interval. Beam-steering or some other spatial processing technique may be used at the BSs 110 and/or UEs 120.

The UEs 120 (e.g., 120x, 120y, etc.) may be dispersed throughout the wireless communications network 100, and each UE 120 may be stationary or mobile. The wireless communications network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

The BSs 110 may communicate with one or more UEs 120 at any given moment on the downlink and uplink. The downlink (i.e., forward link) is the communication link from the BSs 110 to the UEs 120, and the uplink (i.e., reverse link) is the communication link from the UEs 120 to the BSs 110. A UE 120 may also communicate peer-to-peer with another UE 120.

The wireless communications network 100 may use multiple transmit and multiple receive antennas for data transmission on the downlink and uplink. BSs 110 may be equipped with a number Nap of antennas to achieve transmit diversity for downlink transmissions and/or receive diversity for uplink transmissions. A set Nu of UEs 120 may receive downlink transmissions and transmit uplink transmissions. Each UE 120 may transmit user-specific data to and/or receive user-specific data from the BSs 110. In general, each UE 120 may be equipped with one or multiple antennas. The Nu UEs 120 can have the same or different numbers of antennas.

The wireless communications network 100 may be a time division duplex (TDD) system or a frequency division duplex (FDD) system. For a TDD system, the downlink and uplink share the same frequency band. For an FDD system, the downlink and uplink use different frequency bands. The wireless communications network 100 may also utilize a single carrier or multiple carriers for transmission. Each UE 120 may be equipped with a single antenna (e.g., to keep costs down) or multiple antennas (e.g., where the additional cost can be supported).

A network controller 130 (also sometimes referred to as a "system controller") may be in communication with a set of BSs 110 and provide coordination and control for these BSs 110 (e.g., via a backhaul). In certain cases (e.g., in a 5G NR system), the network controller 130 may include a centralized unit (CU) and/or a distributed unit (DU). In certain aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In certain aspects of the present disclosure, the BSs 110 and/or the UEs 120 may include a transceiver implemented with a low intermediate frequency (LIF) offset to improve receiver NF, as described in more detail herein.

Figure 2:
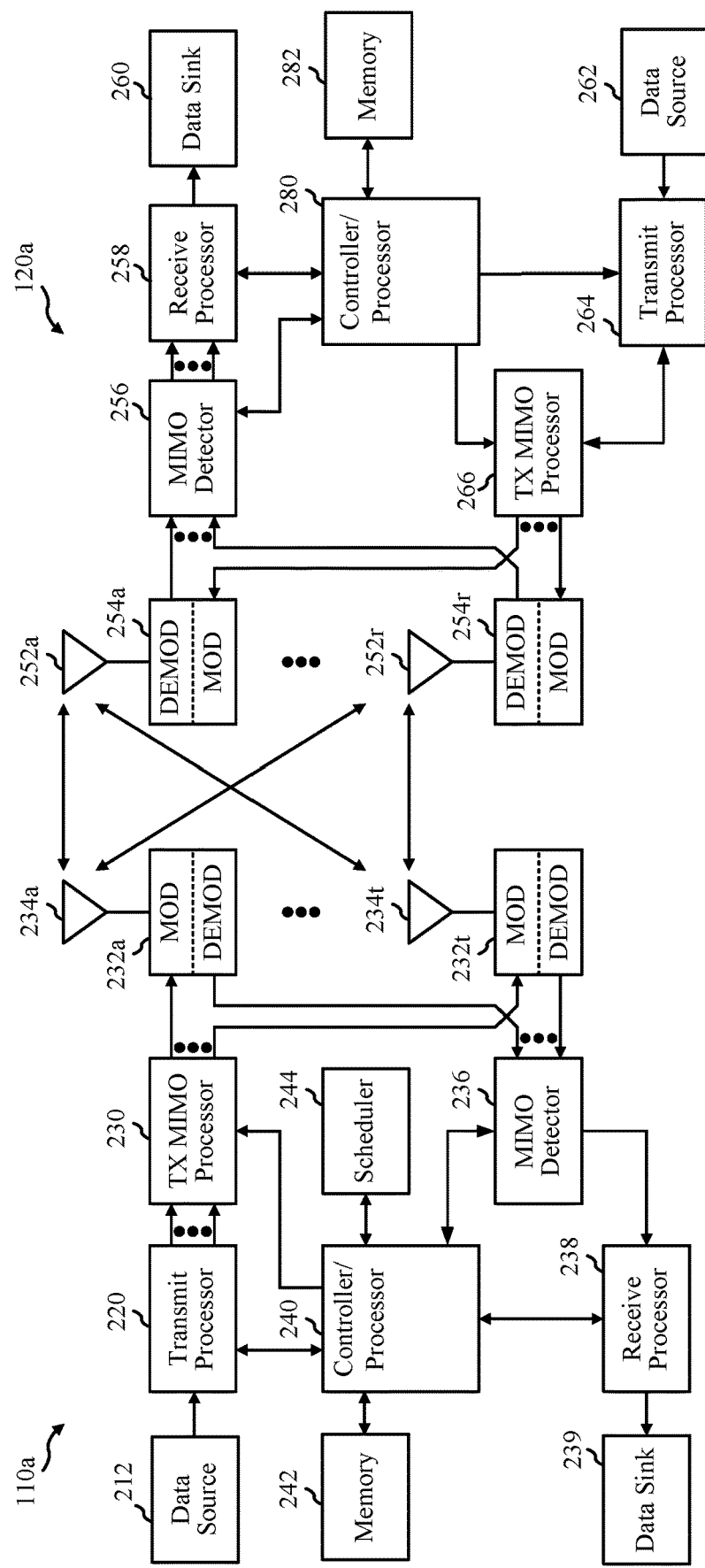
FIG. 2 is a block diagram conceptually illustrating a design of an example base station (BS) and user equipment (UE), in which aspects of the present disclosure may be practiced.

FIG. 2 illustrates example components of BS 110a and UE 120a (e.g., from the wireless communications network 100 of FIG. 1), in which aspects of the present disclosure may be implemented.

On the downlink, at the BS 110a, a transmit processor 220 may receive data from a data source 212, control information from a controller/processor 240, and/or possibly other data (e.g., from a scheduler 244). The various types of data may be sent on different transport channels. For example, the control information may be designated for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be designated for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS).

A transmit (TX) multiple-input, multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. The memories 242 and 282 may also interface with the controllers/processors 240 and 280, respectively. A scheduler 244 may schedule UEs for data transmission on the downlink and/or uplink.

In certain aspects of the present disclosure, the transceivers 232 and/or the transceivers 254 may be implemented with a low intermediate frequency (LIF) offset to improve receiver NF, as described in more detail herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

Example RF Transceiver

Figure 3:
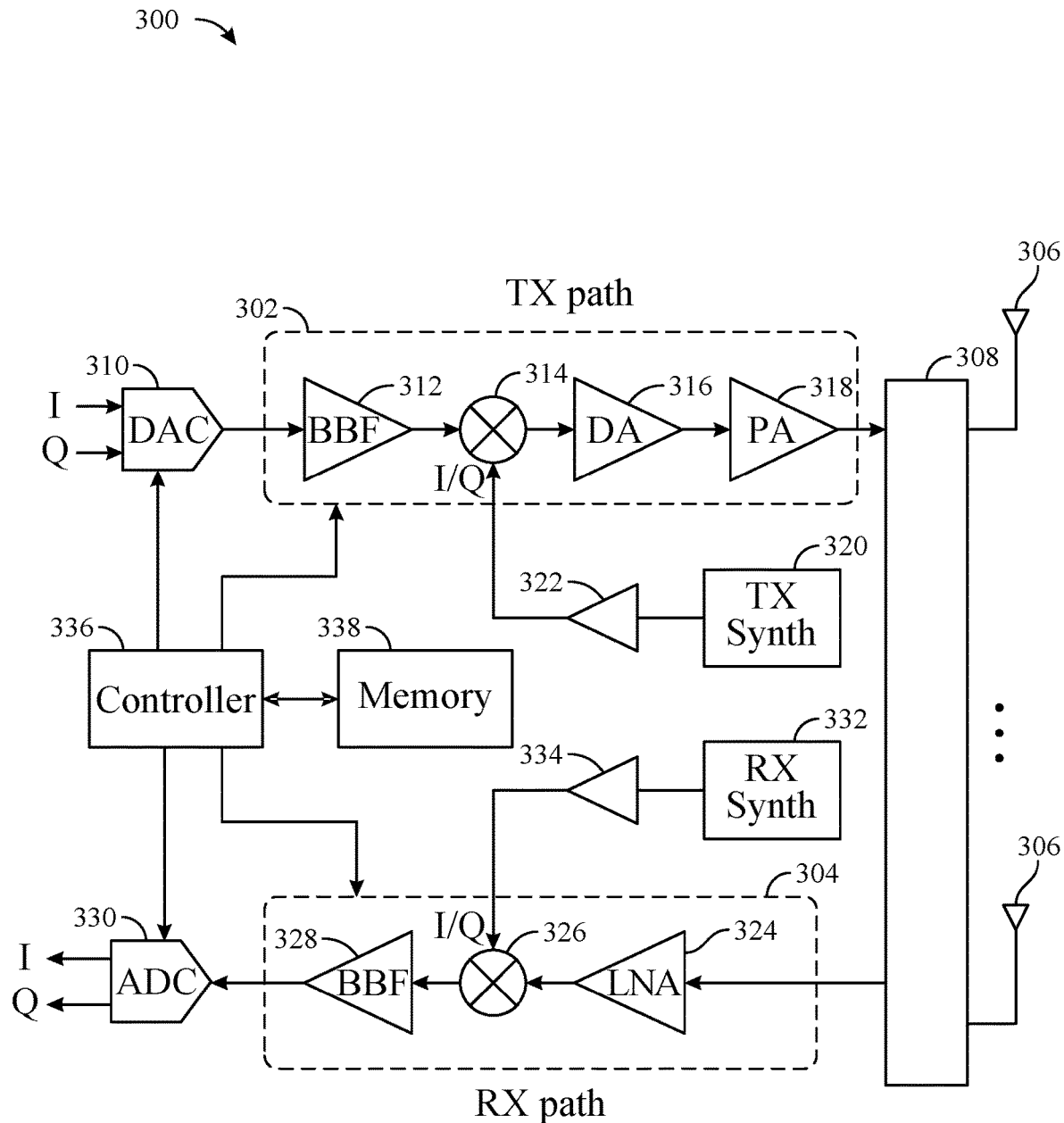
FIG. 3 is a block diagram of an example radio frequency (RF) transceiver, in which aspects of the present disclosure may be practiced.

FIG. 3 is a block diagram of an example radio frequency (RF) transceiver circuit 300, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) and/or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in a radio frequency integrated circuit (RFIC). For certain aspects, the PA 318 may be external to the RFIC.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency-conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna(s) 306. While one mixer 314 is illustrated, several mixers may be used to upconvert the filtered baseband signals to one or more intermediate frequencies and to thereafter upconvert the intermediate frequency (IF) signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna(s) 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I and/or Q signals for digital signal processing.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326. For certain aspects, a single frequency synthesizer may be used for both the TX path 302 and the RX path 304. In certain aspects, the TX frequency synthesizer 320 and/or RX frequency synthesizer 332 may include a frequency divider/multiplier that is driven by an oscillator (e.g., a VCO) in the frequency synthesizer. In some aspects, the transceiver circuit 300 may be implemented with a LIF offset to improve receiver NF, as described in more detail herein.

A controller 336 (e.g., controller/processor 280 in FIG. 2) may direct the operation of the RF transceiver circuit 300A, such as transmitting signals via the TX path 302 and/or receiving signals via the RX path 304. The controller 336 may be a processor, a digital signal processor (DSP), an application-specific integrated circuit (ASIC), a field-programmable gate array (FPGA) or other programmable logic device (PLD), discrete gate or transistor logic, discrete hardware components, or any combination thereof. A memory 338 (e.g., memory 282 in FIG. 2) may store data and/or program codes for operating the RF transceiver circuit 300. The controller 336 and/or the memory 338 may include control logic (e.g., complementary metal-oxide-semiconductor (CMOS) logic).

While FIGS. 1-3 provide wireless communications as an example application in which certain aspects of the present disclosure may be implemented to facilitate understanding, certain aspects described herein may be used for any of various other suitable systems.

Example Techniques for Dynamic Frequency
Shifting to Improve Noise Figure

Some fifth-generation (5G) new radio (NR) and long-term evolution (LTE) downlink receivers may include a primary receive path and a secondary (diversity) receive path. The two paths may form a downlink pipe (DLP). In some implementations, a DLP may support reception from just one base station registered with one subscriber identity module (SIM) at a time. Some applications support reception on two SIMs from two carriers using the same DLP.

Thus, a local oscillator arrangement may support both diversity reception for a single SIM and single path reception (e.g., non-diversity) with two SIMs where a primary receive path (PRx) would connect to a base station or carrier of the first SIM and the diversity receive path (DRx) would connect to a base station or carrier of a second SIM. Some multi-SIM (MSIM) operations involve using multiple DLPs for different SIMs, and some MSIM operations use only one DLP with a PRx and a DRx for different SIMs.

FIG. 4 illustrates a DLP 400 including a PRx 402 and DRx 404. The PRx 402 may include at least one antenna 406 coupled to a radio frequency (RF) front-end (FE) 408. The RF FE 408 may include a low-noise amplifier (LNA) (e.g., corresponding to LNA 324 of FIG. 3) for amplifying a signal received from the antenna. The amplified signal may be provided to a mixer 410 (e.g., corresponding to mixer 326 of FIG. 3) for down-conversion (e.g., signal down-conversion from RF to a baseband (BB) frequency) using a LO signal (not shown). The mixer 410 generates a BB signal that is provided to a BB filter (BBF) 412 (e.g., corresponding to the BBF 328 of FIG. 3) to generate a filtered signal that is then converted from an analog domain to the digital domain via an analog-to-digital converter (ADC) (e.g., corresponding to ADC 330 of FIG. 3) and demodulated using demodulation circuitry 414.

Similarly, the DRx 404 may include at least one antenna 426 coupled to an RF FE 428. The RF FE 428 may include an LNA for amplifying a signal received from the antenna. The amplified signal may be provided to a mixer 430 for down-conversion (e.g., from RF to a baseband (BB) frequency) using another LO signal. The mixer 430 generates a BB signal that is provided to a BBF 432 to generate a filtered signal that is then converted from the analog domain to the digital domain via an ADC and demodulated using demodulation circuitry 434.

In some aspects, multiple synthesizers 491, 493 may be used to generate local oscillator signals, such as a low-power mode (LPM) synthesizer 493 (e.g., implemented using a ring oscillator) and a high-performance mode (HPM) synthesizer 491 (e.g., implemented using an inductor-capacitor (LC) oscillator). The LO signal from synthesizer 491 may be provided to multiplexers 496, 498 (e.g., through a frequency divider 494, labeled "Div N"), and the LO signal from synthesizer 493 may be provided to multiplexers 496, 498 through a buffer 499. The multiplexers 496, 498 may be controlled to direct each LO signal to either the PRx or DRx (e.g., to either mixer 410 for the PRx 402 or mixer 430 for the DRx 404 for down-conversion). For some MSIM applications, the PRx may be associated with a first subscriber (sub1), and the DRx may be associated with a second subscriber (sub2) or vice versa.

In some cases, one receive path (e.g., PRx 402) may be used for traffic, and the other receive path (e.g., DRx 404) may be used for page reception or vice versa. In some cases the receive path used for traffic may use a high-performance synthesizer (e.g., synthesizer 491) with good phase noise. The receive path used for page reception may use the low-performance synthesizer (e.g., synthesizer 493) with poor phase noise to save the transceiver's power, area, and cost. In some other cases, when the signal-to-noise ratio (SNR) specification for traffic is low, traffic may use the low-performance synthesizer (e.g., synthesizer 493). In such cases, page reception may be performed through a high-performance synthesizer (e.g., synthesizer 491).

It may be difficult to achieve proper isolation between the PRx LO and DRx LO (e.g., an isolation of 55 dB), especially in small footprint implementations (e.g., small silicon area for an RF chip) and/or when supply and ground nodes (or circuits) are shared between the paths. Thus, when the LO frequencies for sub1 and sub2 are close (e.g., within a frequency difference threshold), degradation in the noise figure (NF) for sub1 and sub2 may occur.

Sub1 and sub2 may be operated using different bands, such as a low-band (LB), mid-band (MB), high-band (HB), ultra-high band North America (UNA), or new radio unlicensed (NRU) band. If sub1 and sub2 are operating using the same band (e.g., HB), NF degradation may occur. For example, if sub1 and sub2 operate within HB and the LO frequencies of sub1 and sub2 are within a frequency difference threshold (e.g., 5 MHz), NF degradation (e.g., 1 dB NF degradation) may occur at the antenna ports for sub1 and sub2. If the LO frequencies for sub1 and sub2 are the same, a higher NF degradation (e.g., 16.8 dB NF degradation) may occur at the antenna ports, and even higher NF degradation (e.g., 36 dB NF degradation) may occur at the receiver input of the radio (e.g., chip including the mixers 430, 410).

Figure 5A:
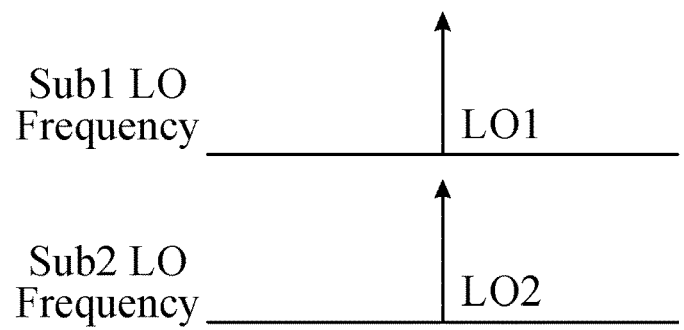
FIGS. 5A, 5B, and 5C illustrate different scenarios of example local oscillator (LO) frequencies for two subscribers.
Figure 5B:
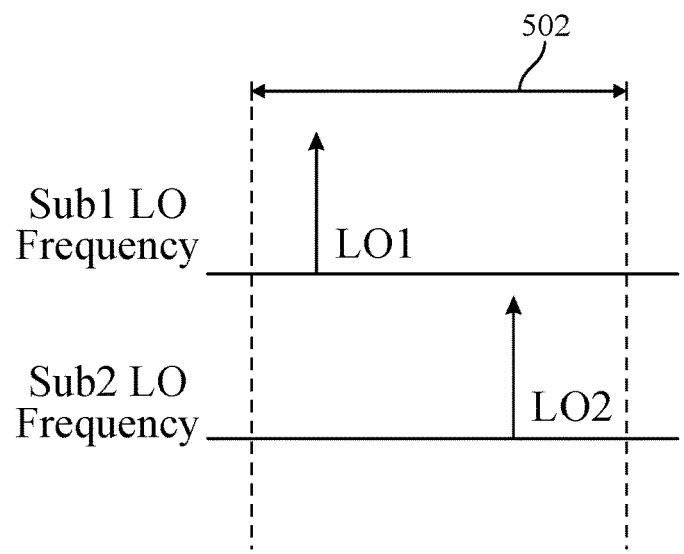
Figure 5C:
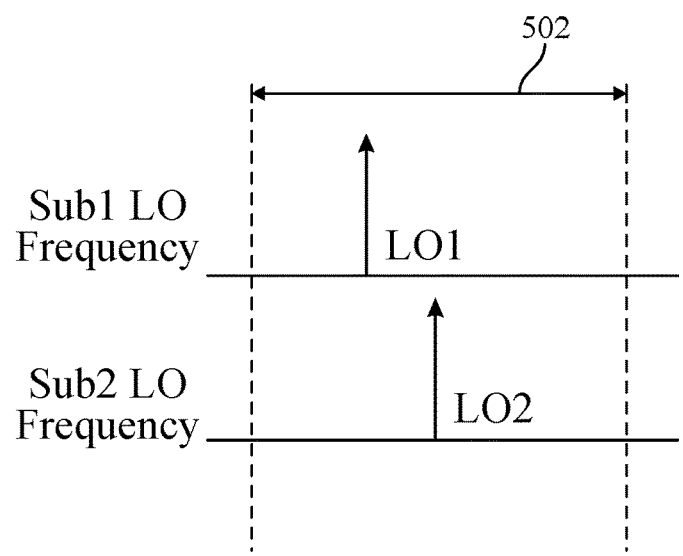

FIGS. 5A, 5B, and 5C illustrate example LO frequencies for sub1 and sub2. As shown in FIG. 5A, the sub1 LO (LO1) frequency may be equal to the sub2 LO (LO2) frequency, in which case high NF degradation may occur as described. Even though both sub1 and sub2 are assigned the same absolute radio-frequency channel number (ARFCN) and although Sub1 can receive a page for Sub2, through resource sharing in the frequency domain (e.g., through the concept of page sharing) the UE may decide to operate with two different LO signals operating at the same frequency, causing the NF degradation described herein. Page sharing refers to an implementation where a page of one subscriber is received by another subscriber, through resource sharing in frequency domain, using the same ARFCN. Page sharing may be implemented when both subscribers are using the same radio technology and the same operator (or network sharing operators).

In some aspects, a frequency difference threshold 502 may be identified. For example, if both sub1 and sub2 are operating in HB, a frequency difference threshold 502 of 5 MHz may be identified so that the NF degradation does not exceed 1 dB. As shown in FIG. 5B, if the difference between the LO1 and LO2 frequencies is less than the frequency difference threshold 502, high NF degradation may occur (e.g., greater than 1 dB). In some cases, as shown in FIG. 5C, the LO1 and LO2 frequencies may be within the frequency difference threshold 502, and the LO frequencies may cause a spur (e.g., beat frequency component) within the baseband channel bandwidth, causing issues with signal processing during reception. For example, this spur within the baseband channel bandwidth may occur if the following expression is true:

$$|m \times LO1 \text{ Frequency} \times LO2 \text{ Frequency}| < \frac{\text{Signal Bandwidth}}{2}$$

where m and n are positive integers and Signal Bandwidth is the RF System BW of Traffic/Paging Sub. Certain aspects of the present disclosure are directed towards dynamically determining and implementing a low intermediate frequency (LIF) offset for a subscriber to provide separation, that is greater than the frequency difference threshold, between the frequencies of the subscribers.

Figure 6A:
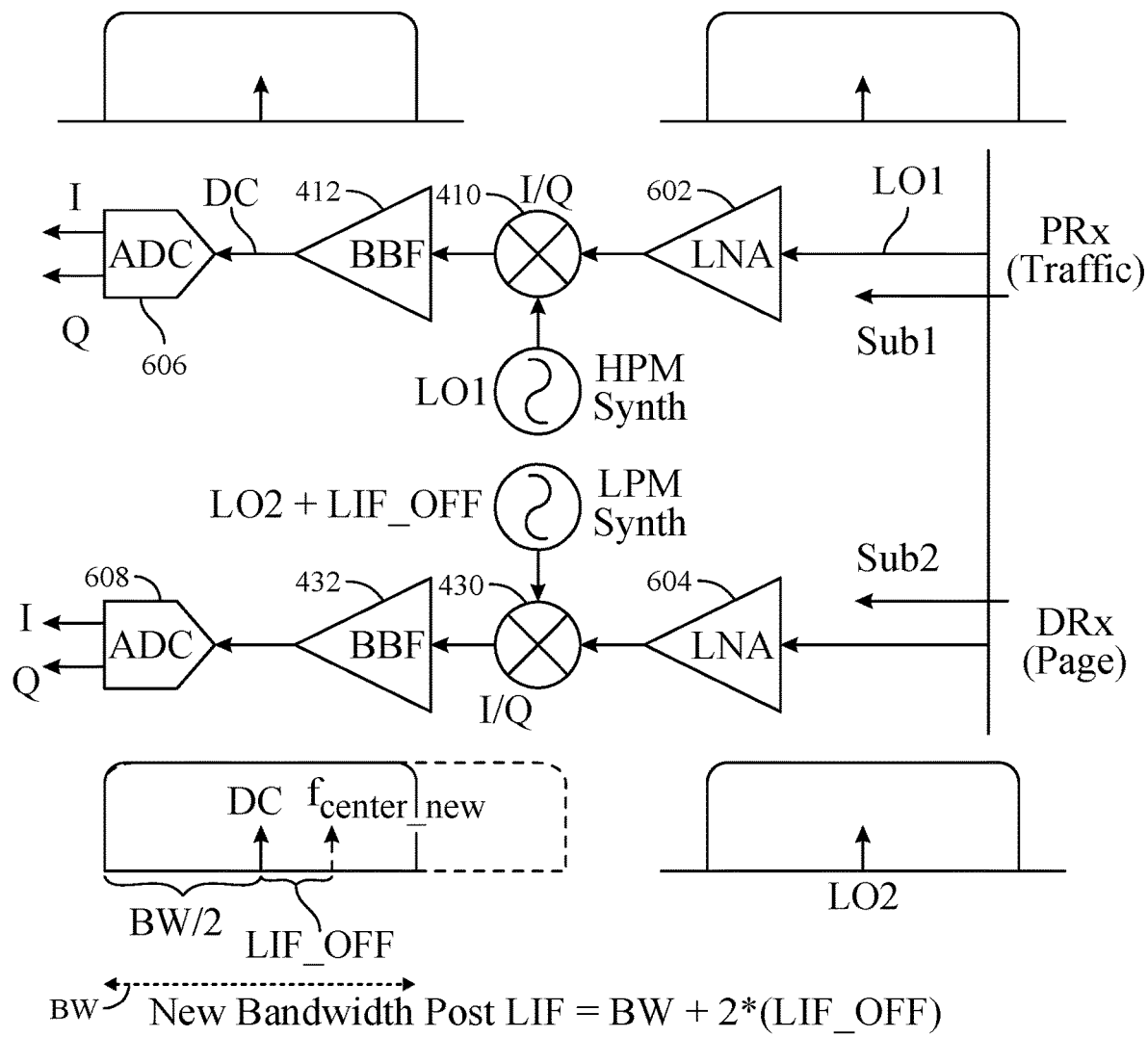
FIG. 6A illustrates example techniques for implementing a low intermediate frequency (LIF) offset, in accordance with certain aspects of the present disclosure.

FIG. 6A illustrates example techniques for implementing a LIF offset (labeled "LIF_OFF"), in accordance with certain aspects of the present disclosure. As shown, traffic may be received by the PRx (e.g., the PRx 402) at the input of LNA 602 to generate an amplified signal that is downconverted by mixer 410. The input signal of the LNA 602 may have a bandwidth with a center frequency equal to the LO1 frequency. The downconverted signal may be filtered by a BBF 412 to generate a filtered signal. As shown, the center frequency of the filtered signal bandwidth may be at direct current (DC) (e.g., 0 hertz). The filtered signal is then converted from the analog domain to the digital domain via an ADC 606, as shown.

Figure 6B:
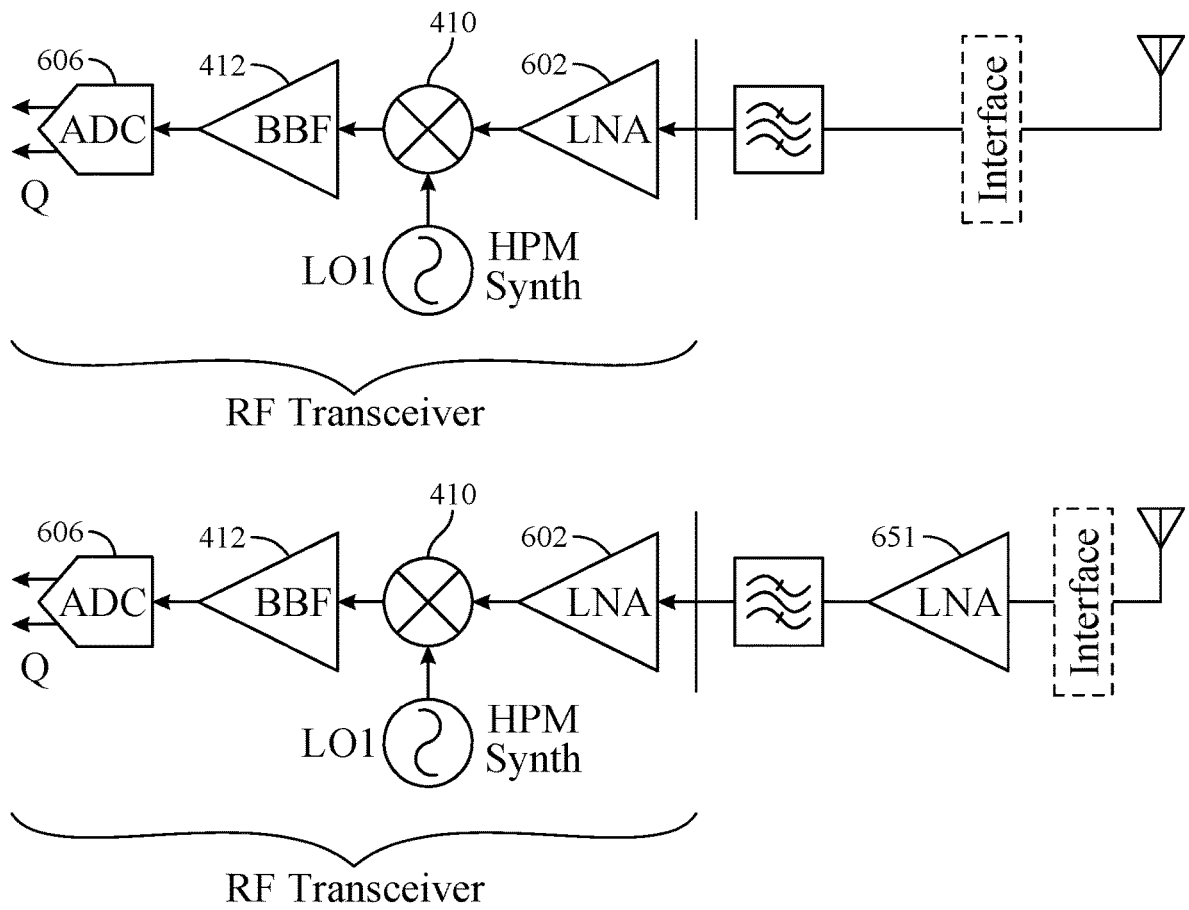
FIG. 6B illustrates a transceiver with an LNA inside or outside the transceiver.

FIG. 6B illustrates a transceiver with an LNA inside or outside the transceiver. For example, the LNA 602 could be inside the RF transceiver as shown, or the LNA may be outside the transceiver. In some cases, amplification may be implemented with a cascade of two LNA's including an LNA 651 outside the transceiver followed by the LNA 602 inside the transceiver, as shown in FIG. 6B. The transceiver may be coupled to an antenna through an antenna interface, as shown.

Referring back to FIG. 6A, a page may be received by the DRx (e.g., the DRx 404) at the input of LNA 604 to generate an amplified signal that is downconverted by mixer 430. The input signal of the LNA 604 may have a bandwidth with a center frequency equal to the LO2 frequency. The downconverted signal may be filtered by a BBF 432 to generate a filtered signal. As shown, the center frequency of the filtered signal bandwidth (labeled "BW") may be at DC. The filtered signal is then converted from the analog domain to the digital domain via an ADC 608, as shown.

In some aspects, a LIF offset (LIF_OFF) may be implemented. To implement the LIF offset, the LO2 frequency may be shifted by the LIF offset. Thus, the new frequency of the LO signal provided to mixer 430 may be equal to the LO2 frequency plus LIF_OFF, as shown. As a result, the filtered signal at the output of the BBF may have a new center frequency ($f_{center\_new}$) that is equal to a no-offset center frequency (e.g., center frequency without applying the LIF offset, which is DC) plus the LIF offset, as shown. Thus, the new bandwidth post applying the LIF offset may be equal to:

$$BW + 2 \times LIF\_OFF$$

The filtered signal is then converted from the analog domain to the digital domain via an ADC 608, as shown.

In some aspects, a wireless device may determine whether to apply a LIF offset during the tuning of a subscriber by checking the active tune configuration (e.g., if present) of the other subscriber. For every subscriber tuning, the device may determine whether to apply a dynamic LIF offset by comparing the tune configuration for that subscriber with a previously configured tune configuration of the other subscriber. For instance, a controller (e.g., using an RF software driver) may check the separation between the LO frequency (e.g., tune configuration) of the first subscriber and the LO frequency of the second subscriber.

Suppose the separation is more than a frequency difference threshold (e.g., frequency difference threshold 502 described with respect to FIGS. 5B and 5C). In that case, no LIF offset may be implemented. A LIF offset may be implemented if the separation is less than the frequency difference threshold. The LIF offset to be applied may be determined per band group based on RF integrated circuit (RFIC) characterization. In other words, for each band group (e.g., LB, MB, HB), the frequency difference threshold may be determined so that the NF degradation does not exceed 1 dB. An RF driver may be used to run a sequence to determine if a spur (m×LO1 frequency−n×LO2 frequency) will fall in the channel bandwidth in the baseband for either traffic or paging (e.g., in the baseband of sub1 or sub2). LIF offset may be applied if the spur will fall in the channel bandwidth. LIF offset application is then performed during the tuning of that subscriber (e.g., one of the subscribers) with digital configuration for de-rotation. For example, for de-rotation, the spectrum may be shifted back in the digital domain to compensate, or at least adjust, for the LIF offset applied in the analog domain.

Figure 7:
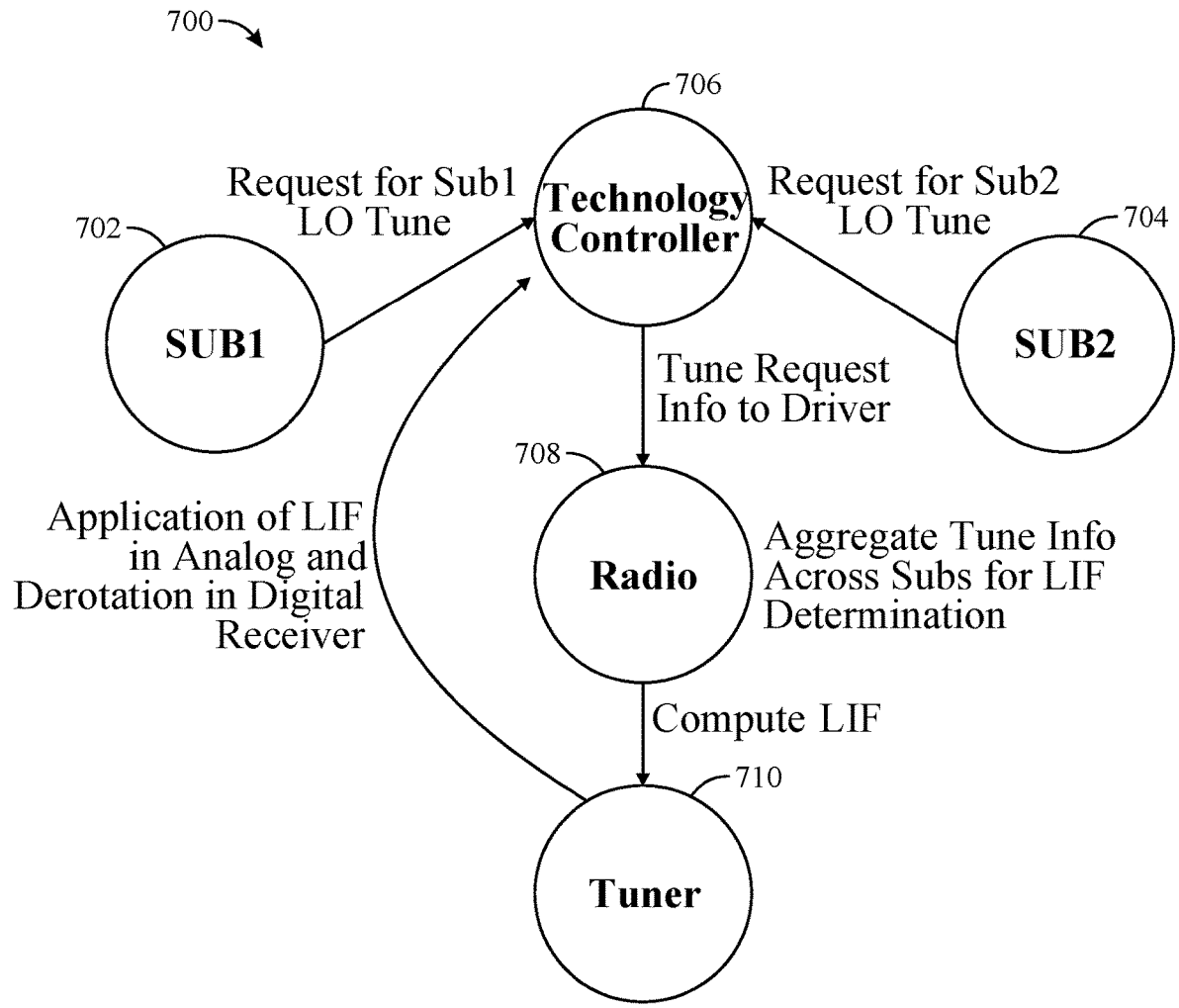
FIG. 7 illustrates example operations for application of a LIF offset, in accordance with certain aspects of the present disclosure.

FIG. 7 illustrates example operations 700 for the application of a LIF offset, in accordance with certain aspects of the present disclosure. At block 702, a controller for a first subscriber (SUB1) may send, to a technology controller 706 (e.g., controller of the radio access technology, such as long-term evolution (LTE) or new radio (NR)), a request for LO tuning for the first subscriber. For example, the controller may send tuning requested information that may include a requested local oscillator frequency for the first subscriber. The tuning request information for the first subscriber may be sent to the radio 708 and the requested tuning of the LO may be performed by an LO tuner 710. At block 704, a controller for a second subscriber (SUB2) may send to the technology controller 706 a request for LO tuning for the second subscriber. The controller 706 may send, to the radio 708, the tuning request information for the second subscriber. The radio 708 may aggregate (e.g., compare) the tuning information for the first subscriber and the second subscriber to determine whether a LIF offset is to be applied for the second subscriber (e.g., since the second subscriber's tuning request occurred later in time). The radio 708 may then compute the LIF offset to be applied. The tuner 710 may then tune the LO frequency for the second subscriber in the analog domain and configure the de-rotation in the digital domain for the second subscriber.

While some example provided herein are described with respect to LTE and NR, any suitable radio access technology (RAT) or combination of RATs for SUB1 and SUB2 may be used. For example, SUB1 and SUB2 may be any of NR, LTE, wideband code division multiple access (WCDMA), global system for mobile (GSM), or CDMA 2000 (C2k), and in any combination between SUB1 and SUB2. Thus, controller 706 may process requests from SUB1 and SUB2 across two different RATs.

FIG. 8 illustrates pseudo code 800 for determining a LIF offset, in accordance with certain aspects of the present disclosure. As shown, if the PRx LO (LO signal for the PRx, labeled "PRX_LO") and DRx LO (LO signal for the DRx, labeled "DRX_LO") are both within LB, no LIF may be applied (e.g., since previous testing may show that NF degradation is acceptable for LB operations even if the LO frequencies of the subscribers are the same). Different LIF offsets may be applied depending on operations in different bands. For example, if the PRX_LO and DRX_LO are within MB, then a LIF value (labeled "LIF" in code 800) may be set to a frequency F1. The code 800 may check if the difference between the LO frequencies (represented by expression abs (PRX_LO-DRX_LO)) is less than the LIF value. Then, one of PRX_LO and DRX_LO (e.g., "PRX_LO/DRX_LO" in code 800) for which LIF offset is to be applied may be set per equation:

$$PRX\_LO/DRX\_LO = \\ PRX\_LO/DRX\_LO +/- (abs(PRX\_LO - DRX\_LO) - LIF)$$

The new effective bandwidth (labeled "Effective_BW") with the LIF offset may be determined per equation:

$$Effective\_BW = \\ PRX/DRX\_channel\_BW + [2 \times abs(abs(PRX\_LO - DRX\_LO) - LIF)]$$

where PRX/DRX_channel_BW is the bandwidth (before applying LIF offset) of one of PRx and DRx for which LIF offset is being applied. Moreover, the RF domain bandwidth (RFIC bandwidth, labeled "RFIC_BW" in pseudo code 800) may be set to be equal to floor (Effective_BW), as shown. The LIF offset may be determined in a similar manner for other bands but using different LIF values. For example, if PRX_LO and DRX_LO are within HB, then the LIF value may be set to a frequency F2, and if the PRX_LO and DRX_LO are within UNA band, then the LIF value may be set to a frequency F3.

Figure 9:
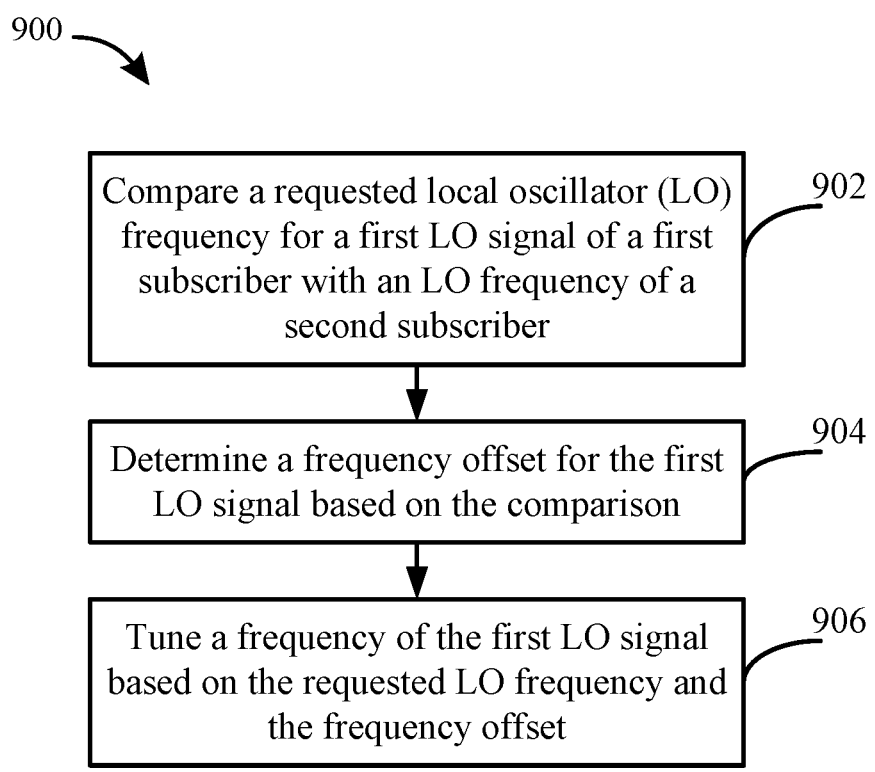
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a wireless device, which may include receive paths (e.g., PRx 402 and DRx 404) and a controller such as the controller/processor 240 or controller/processor 280 of FIG. 2.

At block 902, the wireless device may compare a requested LO frequency for a first LO signal of a first subscriber with an LO frequency for a second LO signal of a second subscriber. For example, the wireless device may process a tuning request for the first LO signal of the first subscriber, the tuning request indicating the requested LO frequency for the first LO signal. The LO frequency of the second LO signal is tuned before reception of the requested LO frequency for the first LO signal.

At block 904, the wireless device may determine a frequency offset (e.g., LIF offset) for the first LO signal based on the comparison. The wireless device may determine whether the first subscriber and the second subscriber are within a same operating band (e.g., MB or HB). The frequency offset may be determined in response to the first subscriber and the second subscriber being within the same operating band. The frequency offset may be determined based on the operating band and ARFCN of the first subscriber.

At block 906, the wireless device may tune a frequency of the first LO signal based on the requested LO frequency and the frequency offset. In some aspects, after tuning the frequency of the first LO signal, the wireless device may receive one of a data signal or a page signal via the first subscriber and receive another one of the data signal or the page signal via the second subscriber.

In some aspects, the wireless device may determine a baseband bandwidth for the first subscriber based on the frequency offset. The wireless device may configure a BBF (e.g., BBF 412 or BBF 432 of FIG. 4) of a receive path (e.g., PRx 402 or DRx 404) for the first subscriber based on the baseband bandwidth.

In some aspects, comparing the requested LO frequency with the LO frequency of the second subscriber may include determining whether a spur frequency associated with the requested LO frequency and the LO frequency for the second LO signal of the second subscriber is within a baseband bandwidth of the first subscriber or the second subscriber. In some aspects, comparing the requested LO frequency with the LO frequency of the second subscriber may include determining whether a frequency difference between the requested LO frequency and the LO frequency of the second subscriber is less than a threshold frequency offset. The frequency offset may be determined so that a frequency difference between the frequency of the first LO signal and the LO frequency of the second subscriber is greater than or equal to the threshold frequency offset.

EXAMPLE ASPECTS

In addition to the various aspects described above, specific combinations of aspects are within the scope of the present disclosure, some of which are detailed below:

Aspect 1: A method for wireless communication, comprising: comparing a requested local oscillator (LO) frequency for a first LO signal of a first subscriber with an LO frequency for a second LO signal of a second subscriber; determining a frequency offset for the first LO signal based on the comparison; and tuning a frequency of the first LO signal based on the requested LO frequency and the frequency offset.

Aspect 2: The method of Aspect 1, wherein the LO frequency of the second LO signal is tuned before reception of the requested LO frequency for the first LO signal.

Aspect 3: The method of Aspect 1 or 2, wherein determining the frequency offset comprises determining whether to use a zero intermediate frequency (IF) or a low intermediate frequency (LIF).

Aspect 4: The method according to any of Aspects 1-3, further comprising determining whether the first subscriber and the second subscriber are within a same operating band, wherein the frequency offset is determined in response to the first subscriber and the second subscriber being within the same operating band.

Aspect 5: The method according to any of Aspects 1-4, further comprising determining the frequency offset based on an operating band of the first subscriber.

Aspect 6: The method according to any of Aspects 1-5, further comprising: determining a baseband bandwidth for the first subscriber based on the frequency offset; and configuring a baseband filter (BBF) of a receive chain for the first subscriber based on the baseband bandwidth.

Aspect 7: The method according to any of Aspects 1-6, further comprising, after tuning the frequency of the first LO signal: receiving one of a data signal or a page signal via the first subscriber; and receiving the page signal via the second subscriber.

Aspect 8: The method according to any of Aspects 1-7, wherein comparing the requested LO frequency with the LO frequency for the second LO signal of the second subscriber comprises determining whether a spur frequency associated with the requested LO frequency and the LO frequency for the second LO signal of the second subscriber is within a baseband bandwidth of the first subscriber or the second subscriber.

Aspect 9: The method according to any of Aspects 1-8, wherein comparing the requested LO frequency with the LO frequency for the second LO signal of the second subscriber comprises determining whether a first frequency difference between the requested LO frequency and the LO frequency for the second LO signal of the second subscriber is less than a threshold frequency offset.

Aspect 10: The method of Aspect 9, wherein the frequency offset is determined so that a second frequency difference between the tuned frequency of the first LO signal and the LO frequency for the second LO signal of the second subscriber is greater than or equal to the threshold frequency offset.

Aspect 11: The method according to any of Aspects 1-10, further comprising processing a tuning request for the first LO signal of the first subscriber, the tuning request indicating the requested LO frequency for the first LO signal.

Aspect 12: An apparatus for wireless communication, comprising: one or more memories collectively storing executable instructions; and one or more processors coupled to the one or more memories, the one or more processors being collectively configured to execute the executable instructions to cause the apparatus to: compare a requested local oscillator (LO) frequency for a first LO signal of a first subscriber with an LO frequency for a second LO signal of a second subscriber; determine a frequency offset for the first LO signal based on the comparison; and tune a frequency of the first LO signal based on the requested LO frequency and the frequency offset.

Aspect 13: The apparatus of Aspect 12, wherein to determine the frequency offset, the one or more processors are collectively configured to execute the executable instructions to cause the apparatus to determine whether to use a zero intermediate frequency (IF) or a low intermediate frequency (LIF).

Aspect 14: The apparatus of Aspect 12 or 13, wherein: the one or more processors are collectively configured to execute the executable instructions to further cause the apparatus to determine whether the first subscriber and the second subscriber are within a same operating band; and the one or more processors are collectively configured to execute the executable instructions to cause the apparatus to determine the frequency offset in response to the first subscriber and the second subscriber being within the same operating band.

Aspect 15: The apparatus according to any of Aspects 12-14, wherein the one or more processors are collectively configured to execute the executable instructions to further cause the apparatus to determine the frequency offset based on an operating band of the first subscriber.

Aspect 16: The apparatus according to any of Aspects 12-15, wherein the one or more processors are collectively configured to execute the executable instructions to further cause the apparatus to: determine a baseband bandwidth for the first subscriber based on the frequency offset; and configure a baseband filter (BBF) of a receive chain for the first subscriber based on the baseband bandwidth.

Aspect 17: The apparatus according to any of Aspects 12-16, wherein the one or more processors are collectively configured to execute the executable instructions to further cause the apparatus to, after tuning the frequency of the first LO signal: receive one of a data signal or a page signal via the first subscriber; and receive another one of the page signal via the second subscriber.

Aspect 18: The apparatus according to any of Aspects 12-17, wherein, to compare the requested LO frequency with the LO frequency of the second subscriber, the one or more processors are collectively configured to execute the executable instructions to cause the apparatus to determine whether a spur frequency associated with the requested LO frequency and the LO frequency for the second LO signal of the second subscriber is within a baseband bandwidth of the first subscriber or the second subscriber.

Aspect 19: A wireless device, comprising: a receiver comprising: a first receive path for a first subscriber, the first receive path including a first mixer for signal down-conversion using a first local oscillator (LO) signal; and a second receive path for a second subscriber, the second receive path including a second mixer for signal down-conversion using a second LO signal; and one or more controllers coupled to the receiver and collectively configured to: compare a requested LO frequency for the first LO signal with an LO frequency of the second LO signal; determine a frequency offset for the first LO signal based on the comparison; and tune a frequency of the first LO signal based on the requested LO frequency and the frequency offset.

Aspect 20: The wireless device of Aspect 19, wherein: the first receive path comprises a primary receive path, and the second receive path comprises a diversity receive path; or the second receive path comprises a primary receive path, and the first receive path comprises a diversity receive path.

The above description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communication, comprising:
   comparing a requested local oscillator (LO) frequency for a first LO signal of a first subscriber with an LO frequency for a second LO signal of a second subscriber;
   determining a frequency offset for the first LO signal based on the comparison; and
   tuning a frequency of the first LO signal based on the requested LO frequency and the frequency offset, wherein the LO frequency of the second LO signal is tuned before reception of the requested LO frequency for the first LO signal.

2. The method of claim 1, wherein determining the frequency offset comprises determining whether to use a zero intermediate frequency (IF) or a low intermediate frequency (LIF).

3. The method of claim 1, further comprising determining whether the first subscriber and the second subscriber are within a same operating band, wherein the frequency offset is determined in response to the first subscriber and the second subscriber being within the same operating band.

4. The method of claim 1, further comprising determining the frequency offset based on an operating band of the first subscriber.

5. The method of claim 1, further comprising:
   determining a baseband bandwidth for the first subscriber based on the frequency offset; and
   configuring a baseband filter (BBF) of a receive chain for the first subscriber based on the baseband bandwidth.

6. The method of claim 1, further comprising, after tuning the frequency of the first LO signal:
   receiving one of a data signal or a page signal via the first subscriber; and
   receiving the page signal via the second subscriber.

7. The method of claim 1, wherein comparing the requested LO frequency with the LO frequency for the second LO signal of the second subscriber comprises determining whether a spur frequency associated with the requested LO frequency and the LO frequency for the second LO signal of the second subscriber is within a baseband bandwidth of the first subscriber or the second subscriber.

8. The method of claim 1, wherein comparing the requested LO frequency with the LO frequency for the second LO signal of the second subscriber comprises determining whether a first frequency difference between the requested LO frequency and the LO frequency for the second LO signal of the second subscriber is less than a threshold frequency offset.

9. The method of claim 8, wherein the frequency offset is determined so that a second frequency difference between the tuned frequency of the first LO signal and the LO frequency for the second LO signal of the second subscriber is greater than or equal to the threshold frequency offset.

10. The method of claim 1, further comprising processing a tuning request for the first LO signal of the first subscriber, the tuning request indicating the requested LO frequency for the first LO signal.

11. An apparatus for wireless communication, comprising:
   one or more memories collectively storing executable instructions; and
   one or more processors coupled to the one or more memories, the one or more processors being collectively configured to execute the executable instructions to cause the apparatus to:
      compare a requested local oscillator (LO) frequency for a first LO signal of a first subscriber with an LO frequency for a second LO signal of a second subscriber;
      determine a frequency offset for the first LO signal based on the comparison; and
      tune a frequency of the first LO signal based on the requested LO frequency and the frequency offset, wherein the LO frequency of the second LO signal is tuned before reception of the requested LO frequency for the first LO signal.

12. The apparatus of claim 11, wherein to determine the frequency offset, the one or more processors are collectively configured to execute the executable instructions to cause the apparatus to determine whether to use a zero intermediate frequency (IF) or a low intermediate frequency (LIF).

13. The apparatus of claim 11, wherein:
   the one or more processors are collectively configured to execute the executable instructions to further cause the apparatus to determine whether the first subscriber and the second subscriber are within a same operating band; and
   the one or more processors are collectively configured to execute the executable instructions to cause the apparatus to determine the frequency offset in response to the first subscriber and the second subscriber being within the same operating band.

14. The apparatus of claim 11, wherein the one or more processors are collectively configured to execute the executable instructions to further cause the apparatus to determine the frequency offset based on an operating band of the first subscriber.

15. The apparatus of claim 11, wherein the one or more processors are collectively configured to execute the executable instructions to further cause the apparatus to:
   determine a baseband bandwidth for the first subscriber based on the frequency offset; and
   configure a baseband filter (BBF) of a receive chain for the first subscriber based on the baseband bandwidth.

16. The apparatus of claim 11, wherein the one or more processors are collectively configured to execute the executable instructions to further cause the apparatus to, after tuning the frequency of the first LO signal:
   receive one of a data signal or a page signal via the first subscriber; and
   receive another one of the page signal via the second subscriber.

17. The apparatus of claim 11, wherein, to compare the requested LO frequency with the LO frequency of the second subscriber, the one or more processors are collectively configured to execute the executable instructions to cause the apparatus to determine whether a spur frequency associated with the requested LO frequency and the LO frequency for the second LO signal of the second subscriber is within a baseband bandwidth of the first subscriber or the second subscriber.

18. A wireless device, comprising:
   a receiver comprising:
      a first receive path for a first subscriber, the first receive path including a first mixer for signal down-conversion using a first local oscillator (LO) signal; and
      a second receive path for a second subscriber, the second receive path including a second mixer for signal down-conversion using a second LO signal; and
   one or more controllers coupled to the receiver and collectively configured to:
      compare a requested LO frequency for the first LO signal with an LO frequency of the second LO signal;
      determine a frequency offset for the first LO signal based on the comparison; and
      tune a frequency of the first LO signal based on the requested LO frequency and the frequency offset, wherein the LO frequency of the second LO signal is tuned before reception of the requested LO frequency for the first LO signal.

19. The wireless device of claim 18, wherein:
   the first receive path comprises a primary receive path, and the second receive path comprises a diversity receive path; or
   the second receive path comprises a primary receive path, and the first receive path comprises a diversity receive path.

* * * * *